United States Patent [19]

Persson et al.

[11] Patent Number: 4,829,685
[45] Date of Patent: May 16, 1989

[54] STRETCHER FRAME WITH MANUALLY ROTATABLE CORNER STRETCHING ELEMENTS

[76] Inventors: Gösta Persson, Box 56, S-590 60 Ljungsbro; Egon Swedberg, Ekholmsvägen 417, S-582 61 Linköping, both of Sweden

[21] Appl. No.: 149,666

[22] Filed: Jan. 28, 1988

[30] Foreign Application Priority Data

Jan. 28, 1987 [SE] Sweden ................................. 8700330

[51] Int. Cl.[4] .............................................. D06C 3/08
[52] U.S. Cl. .................................. 38/102.5; 160/374.1; 160/381; 403/402
[58] Field of Search ............... 403/401, 402, 297, 295; 160/374.1, 381; 38/102.91, 102.4, 102.5, 102.6, 102.7

[56] References Cited

U.S. PATENT DOCUMENTS

| | | | |
|---|---|---|---|
| 349,631 | 9/1886 | Cutts | 160/381 |
| 371,934 | 10/1887 | Gray | 160/374.1 |
| 3,238,996 | 3/1966 | Munn | 160/374.1 |
| 4,041,861 | 8/1977 | Alter | 38/102.91 |
| 4,509,882 | 4/1985 | Lautenschlager | 403/402 |

FOREIGN PATENT DOCUMENTS 551434 1/1958 Canada ................................. 403/402

*Primary Examiner*—Andrew M. Falik
*Attorney, Agent, or Firm*—Burns, Doane, Swecker & Mathis

[57] ABSTRACT

A stretcher frame comprises a plurality of frame parts which face one another at their corner surfaces. A rotary stretching element has portions thereof extending into both recesses of opposing corner surfaces to prevent relative movement between the parts in a direction parallel to an axis of rotation of the stretching element. The stretching element includes a first bearing surface bearing against a wall of one frame part, and a second bearing surface bearing against a wall of the other frame part. The second bearing surface is non-symmetrical relative to the axis of rotation whereby the frame parts are spread apart in response to rotation of the stretching element.

7 Claims, 2 Drawing Sheets

STRETCHER FRAME WITH MANUALLY ROTATABLE CORNER STRETCHING ELEMENTS

BACKGROUND OF THE INVENTION

This invention is related to a stretcher frame that, for example, can be used in embroidering to stretch a cloth, as well as for the mounting of a canvas for oil painting. These frames include frame parts that are joined to each other by means of finger joints. After fastening of the canvas or cloth on the frame, for instance by means of staples on the outside of the frame, canvas is stretched by the expanding the frame by means of wedges forcibly inserted on the inside corners of a frame. These wedges are then retained, due to the friction, as long as the stretching forces remain. When the wood of the frame with time dries, or the cloth or canvas yields the wedges can easily fall out. The use of this type of frame is time-consuming and requires a certain skill that, at least initially, difficulty may be experienced in manipulating same.

In view of the above problems with stretchable frames, the invention has as its object to provide a stretching frame that is easy to handle and does not require any skill whatsoever to actuate, and does not require dislodgeable wedges.

SUMMARY OF THE INVENTION

The objects are achieved by the present invention involving a stretcher frame. The stretcher frame comprises a plurality of frame parts which face one another at their corner surfaces. A rotary stretching element has portions thereof extending into both recesses of opposing corner surfaces to prevent relative movement between the parts in a direction parallel to an axis of rotation of the stretching element. The stretching element includes a first bearing surface bearing against a wall of one frame part, and a second bearing surface bearing against a wall of the other frame part. The second bearing surface is non-symmetrical relative to the axis of rotation whereby the frame parts are spread apart in response to rotation of the stretching element.

BRIEF DESCRIPTION OF THE DRAWINGS

The object and advantages of the invention will become apparent from the following detailed description of a preferred embodiment thereof in connection with the accompanying drawings, in which like numerals designate like elements, and in which.

DESCRIPTION OF A PREFERRED EMBODIMENT OF THE INVENTION

Figure 1:
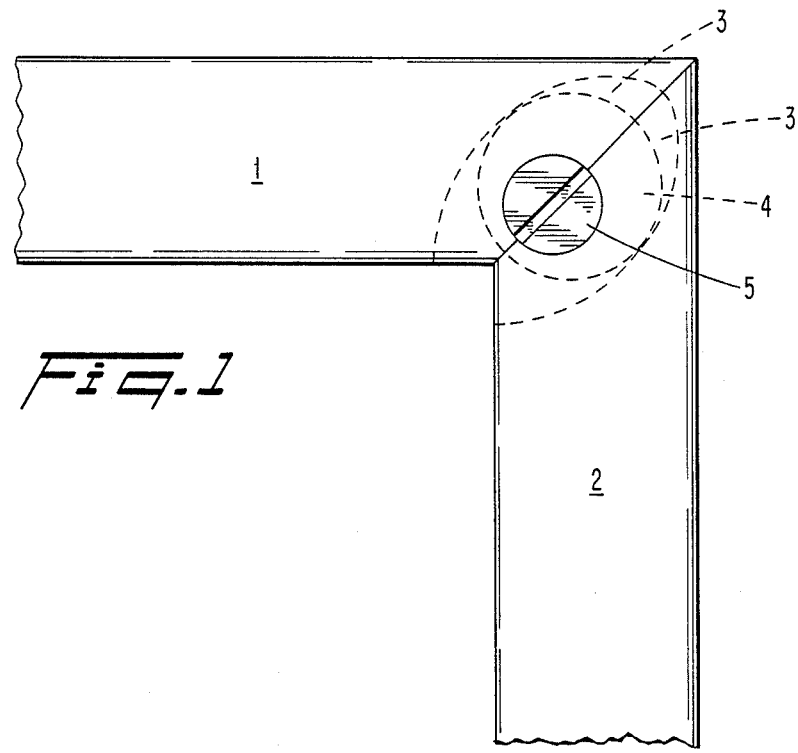
FIG. 1 depicts a corner of a stretcher frame.
Figure 2:
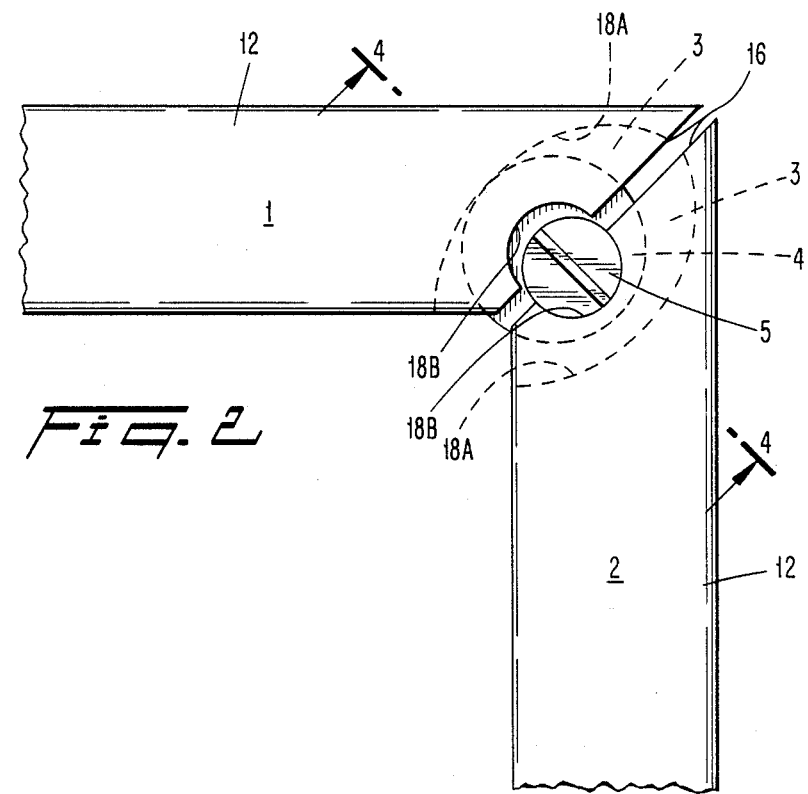
FIG. 2 is a view similar to FIG. 1 with the corner in an expanded position.

The corner of a stretcher frame as shown in FIG. 1 consists of two parts 1 and 2. Each part 1, 2 comprises front and rear sides 12, 14 which are spaced apart in a front-to-rear direction of the frame. The joint contact or corner surface 16 cut 45° relative to the parts 1 and 2, an oval recess 3 has been machined and a circular disk 4 of a stretching element is inserted therein. Since each corner surface 16 includes a recess 3, portions of the disk 4 can be inserted into both of the recesses in a lateral direction relative to the front-to-rear direction. Each corner surface includes laterally extending stop surfaces 20, 22, and a front-to-rear extending wall having sections 18A, 18B. Wall section 18A defines a wall of the recess 3. The stop surfaces 20, 22 are spaced apart in the front-to-rear direction. Since the disk 4 extends into both of the recesses 3 such that dislodgement of the stretching element from the frame is prevented by the stop surfaces 20, 22. The disk 4 is slightly eccentrically provided with a hub portion 5 extending through the frame and, in each end being provided with a diametrical slot to be easily gripped by a screw driver or a small coin. In addition to the slots, a key grip of, for instance a hexagon type can extend through the hub portion. The hub is recessed into the frame parts in an opening with the corresponding diameter. The size of the disk 4 is so related to the oval recess 3 and with a turning of the disk, the frame parts can be pressed away from each other by the eccentricity of the disk since the disk is non-symmetrical relative to the axis of rotation 24 of the stretching element, which axis extends in the front-to-rear direction. Thus, upon rotation of the stretching element about the axis 24, a bearing surface of the disk 4 pushes against the front-to-rear extending wall section 18A of one frame part 2, while a bearing surface of the hub 5 pushes against the wall section 18B of the other part 1 to spread the parts away from one another within the plane of the frame. The eccentricity of the disk is very small since a movement of only a few millimeters is necessary. As a result, the disk 4 will become selflocking in the recess 3 by the tension forces exerted by the stretched cloth or canvas. Independent of the turning direction of the disk, the frame parts are pushed apart by the disk resting against one frame part and a hub against the other. Since movement is allowed lengthwise of the joint, the frame will adapt to the forces in the cloth or canvas so that the material is simultaneously stretched in two right angle directions.

Figure 5:
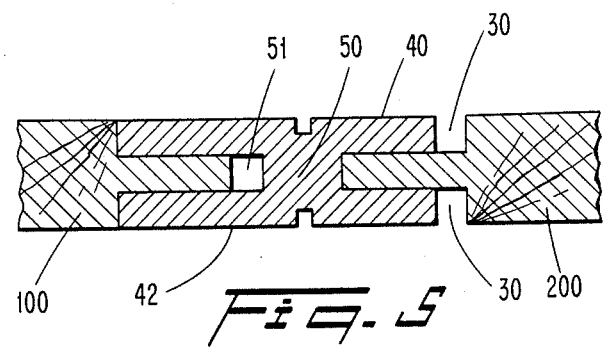
FIG. 5 is a cross-sectional view similar to FIG. 4 of a modified form of the invention.

Within the scope of the invention one can also consider other embodiments, for instance the recess need not necessarily be oval but can of course also be allowed to have a straight line bottom. Also the disk need not be eccentrically journaled but instead can be oval or polygon-shaped but with different diameters to allow for stretching. Nor does the disk need to be hidden inside the frame parts as has been shown, but as depicted in FIG. 5, it is also possible to have an H-shaped stretching element consisting of an oval disk 40 at the front side of the frame placed in a more or less oval recess 30 and that the disk is provided with a hub 50 extending through a hole 51 in the frame parts 100, 200. The hub can on the rear side of the frame have another disk 4 or the thread for a nut (possibly a friction locking nut) can be fastened to the hub locking the frame parts and the stretching element in their interrelated positions.

Figure 3:
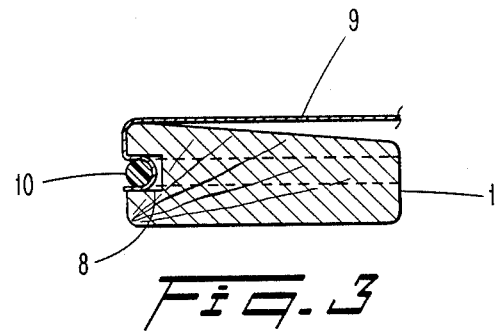
FIG. 3 is a cross-sectional view through a part of the frame.
Figure 4:
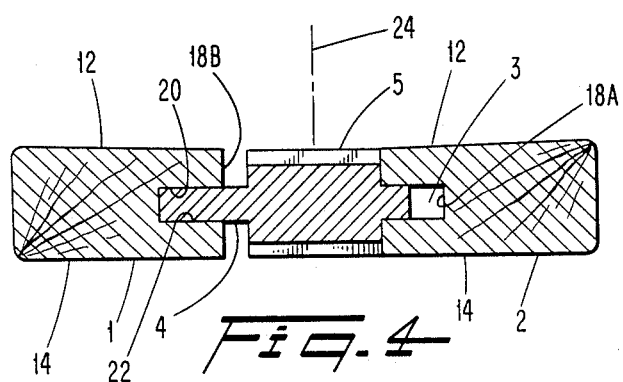
FIG. 4 is a cross-sectional view taken along the line 4—4 in FIG. 2.

In FIG. 3 is shown how a frame in particular for needle point or the like at its outer edge is provided with a groove 8. This groove is used to retain the cloth 9 that is to be embroided or sewn into. The cloth is pressed down into the groove by means of an elastic plastic or rubber band 10 or alternatively a rubber string. The depth of the groove is so much greater than the diameter of the hose or the string that the band and the cloth are retained in the groove once pressed home. The groove can also be undercut to improve its retaining forces. Of course, other ways and means can be used to obtain the locking of the cloth or canvas to the frame.

In most cases the guiding given by the disk of the expanding or stretching element will suffice to give a sufficiently stabile joint. If desirable however the parts of the joints where no expansion means are present can be provided with finger joint members which will further enhance the stability of the frame.

We claim:

1. A stretcher frame comprising a plurality of frame parts, said frame parts adjoining one another in pairs at respective corners of said frame, said frame parts including front and rear sides spaced apart in a front-to-rear direction of said frame, each adjoining pair of frame parts including mutually facing first and second corner surfaces interconnecting said front and rear sides of respective frame parts, said first and second corner surfaces including first and second recess means, respectively, and stabilizing and stretching means comprising one stretching element having portions thereof disposed in both of said first and second recess means for opposing relative movement between said frame parts in said front-to-rear direction, said stretching element being rotatable about an axis extending in said front-to-rear direction and including an exposed tool-receiving portion for receiving a manual tool for producing manual rotation of said stretching element, said stretching element including a first bearing surface bearing against a front-to-rear extending wall of said first corner surface and a second bearing surface extending non-symmetrically relative to said axis and bearing against a front-to-rear extending wall of said second corner surface for spreading said frame parts away from one another within the plane of said frame in response to rotation of said stretching element about said axis.

2. A stretcher frame according to claim 1, wherein one of said front-to-rear extending walls is formed in said recess means of the respective corner surface, and said bearing surface which bears against said one front-to-rear extending wall being formed on a portion of said stretching element disposed in said last-named recess means.

3. A stretcher frame according to claim 1, wherein each of said first and second recess means includes stop surfaces extending laterally relative to an associated one of said walls, said stop surfaces being spaced in said front-to-rear direction, said stretching element including hub means and disk means disposed adjacently in said front-to-rear direction and extending radially from said axis by different distances, respectively, said first bearing surface being carried by said hub means and said second bearing surface being carried by said disk means, said disk means being disposed in both of said first and second recess means such that dislodgement of said stretching element in said front-to-rear direction is blocked by said stop surfaces of both recess means.

4. Stretcher frame according to claim 3, wherein said disk means comprises an oval-shaped disk.

5. Stretcher frame according to claim 3, wherein said stretching element is generally H-shaped in cross-section, said disk means comprising first and second disks spaced apart in said front-to-rear direction and interconnected by said hub means, said stop surfaces of each of said recesses being disposed between said disks.

6. Stretcher frame according to claim 3, wherein each of said first and second recesses is of half-oval shape.

7. Stretcher frame according to claim 1, wherein said tool-receiving portion of said stretching element includes a diametrically extending groove for receiving a turning tool.

* * * * *